United States Patent [19]
Hikoso et al.

[11] Patent Number: 5,745,529
[45] Date of Patent: Apr. 28, 1998

[54] POST DETECTION INTERGRATION (PDI) RECEIVER

[75] Inventors: Keiji Hikoso, Narashino; Naoki Okamoto, Chiba, both of Japan

[73] Assignee: Sharp Kabushiki Kaisha, Osaka, Japan

[21] Appl. No.: 657,943

[22] Filed: Jun. 4, 1996

[30] Foreign Application Priority Data

Jun. 5, 1995 [JP] Japan ................................. 7-138219

[51] Int. Cl.⁶ .................................................. H04B 7/216
[52] U.S. Cl. ........................... 375/316; 375/206; 375/207
[58] Field of Search ........................... 370/200, 206–208, 370/325–326, 328, 331–332, 340, 343, 344, 345, 342, 441

[56] References Cited

U.S. PATENT DOCUMENTS

| | | | |
|---|---|---|---|
| 4,984,247 | 1/1991 | Kaufmann et al. | 375/200 |
| 5,495,506 | 2/1996 | Shoji | 375/344 |
| 5,579,345 | 11/1996 | Kroeger et al. | 375/344 |
| 5,590,160 | 12/1996 | Ostman | 375/367 |
| 5,594,758 | 1/1997 | Petranovich | 375/344 |

FOREIGN PATENT DOCUMENTS

4-230137  8/1992  Japan.

*Primary Examiner*—Young T. Tse
*Attorney, Agent, or Firm*—David G. Conlin; William J. Daley, Jr.

[57] ABSTRACT

In a PDI receiver, received signals are digitized by A/D converting portion, correlated by digital matched filters, amplitude of the correlated value is calculated from the correlated output by a correlated value calculating portion, a reproduction clock is generated in accordance with the calculated correlated value by a clock reproducing portion, and the correlated output is demodulated by a differential demodulating portion. Using the clock signal as a reference, a window pulse is generated by a window generating portion, and only during the pulse period, an AND gate is opened, outputs therefrom are integrated by an integrating portion, and data is detected by a detecting portion.

10 Claims, 10 Drawing Sheets

POST DETECTION INTERGRATION (PDI) RECEIVER

BACKGROUND OF THE INVENTION

1. Field of the Invention

The present invention relates to a spread spectrum communication system of direct sequence. More specifically, the present invention relates to an improvement in an PDI (Post Detection Integration) receiver.

2. Description of the Background Art

Communication using narrow band modulation system such as AM, FM, BPSK, QPSK has been conventionally used in the field of data communication. In such a system, demodulation at the receiver can be carried out by a relatively small circuitry. However, such a system is weak against multipath fading and narrow band noise.

By contrast, in spread spectrum communication system, frequency spectrum of data is spread by a PN (pseudo noise) code at the transmitter side, while the PN code and the data are synchronized (correlated) on the receiver side, so that the influence of multipath fading and narrow band noise can be reduced, which system has attracting increasing attention as a promising technique.

The method of spread spectrum communication includes direct sequence, frequency hopping, time hopping and a hybrid combining some of these. Direct sequence spreads the spectrum by multiplying data and the PN code having a chip rate considerably higher than the data rate, of which circuitry can be implemented relatively easily as compared with those used in other methods. Use of different PN codes allow multiple access in the same band. Such multiple access is called CDMA (Code Division Multiple Access) or SSMA (Spread Spectrum Multiple Access).

As described above, in the direct sequence method, the frequency spectrum is spread by multiplying a PN code which has considerably higher rate than the symbol rate. Because of the property of PN code, separation of multipath wave received delayed by more than 1 chip from the received signal becomes possible.

RAKE method and PDI method have been known as methods for improving diversity in the fading propagation path of spread spectrum communication of direct sequence, utilizing the above described feature. In these methods, diversity is obtained by separating and combining signals of respective paths delayed in time. The RAKE receiver has a complicated structure, and the PDI receiver has been developed in which information is transmitted by DPSK (differential phase shift keying) by differential coding or the like in order to simplify the structure of the receiver. In the PDI method, as its name implies, demodulation is performed by integrating detected received signals for a prescribed time period defined by the propagation path, using a delay circuit. In the RAKE method, signals separated in time are each weighted, and then integrated. It goes without saying that RAKE method has superior performance. However, the PDI method can be implemented in a simple manner, and the properties can be improved to some extent.

Figure 9:
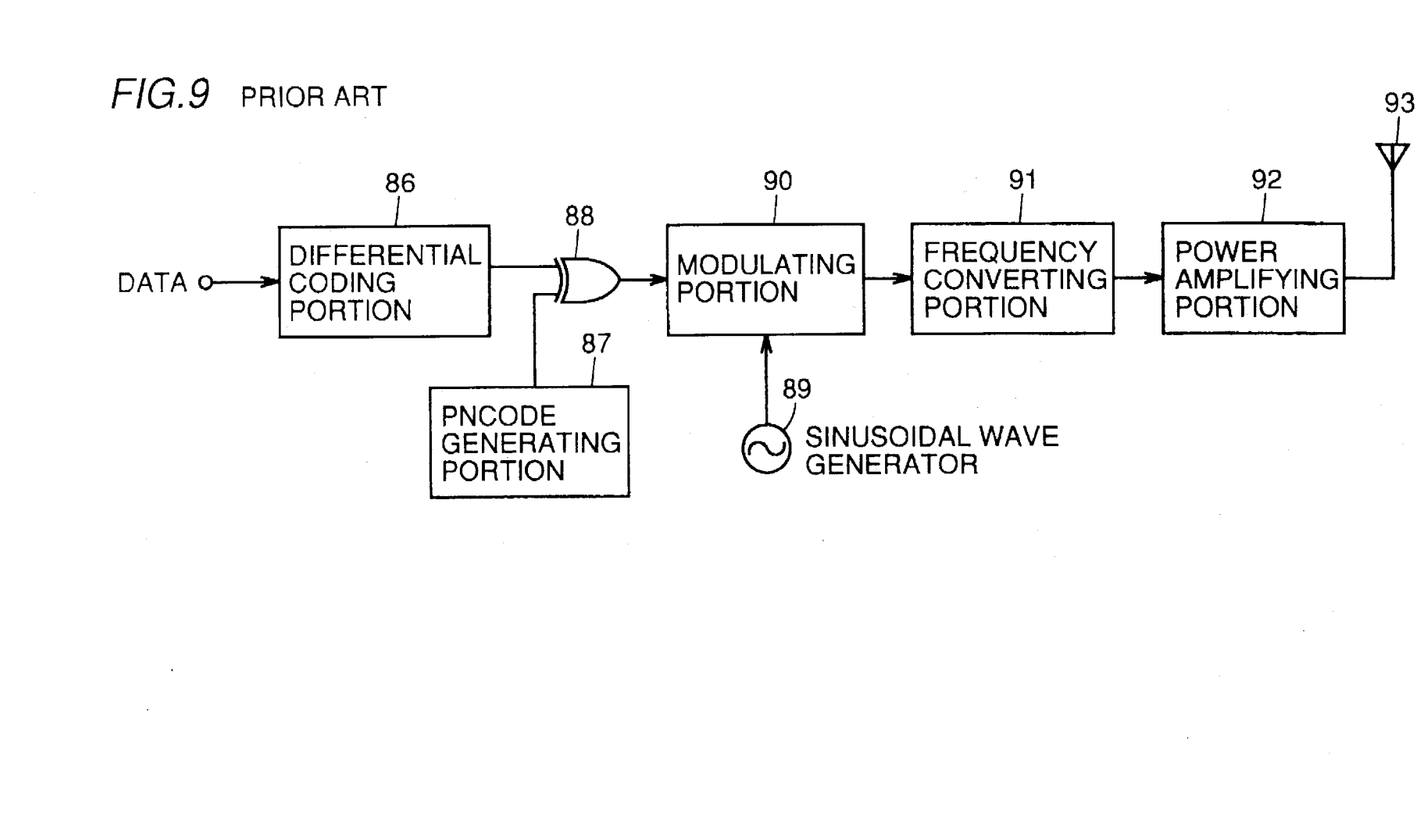
FIG. 9 is a block diagram of a transmitting system in accordance with a conventional direct sequence spread spectrum communication system.
Figure 10:
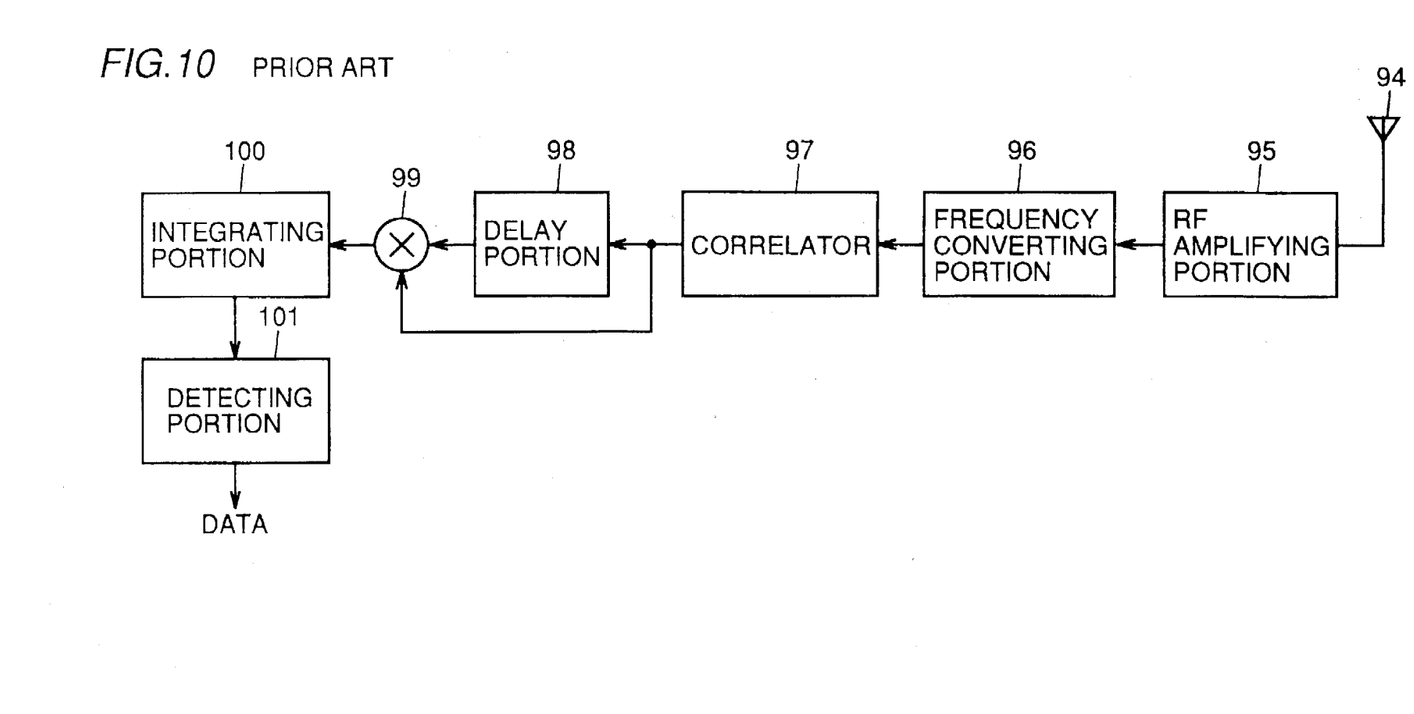
FIG. 10 is a block diagram of a conventional PDI receiver.

FIGS. 9 and 10 are schematic block diagrams showing the transmitter and the receiver of the spread spectrum communication system in accordance with the PDI method.

First, the transmitting system will be described with reference to FIG. 9. Binary transmit data sequence represented by +1 or 0 is first differentially coded at a differential coding portion 86. The differentially coded data sequence and a PN code (binary code sequence represented by +1 or 0) generated by a PN code generating portion 87 are input to an EX-OR circuit 88, and an exclusive OR is provided. The resulting code sequence is multiplied by a sinusoidal wave generated at a sinusoidal wave generator 89, and subjected to BPSK modulation at a modulating portion 90. Thereafter, the code sequence is passed to a frequency converting portion 91 so that it has RF band frequency, power amplified by a power amplifying portion 92, and then transmitted from a transmission antenna 93.

On the receiver side, referring to FIG. 10, the signals received by a receiving antenna 94 is subjected to high frequency amplification by an RF amplifying portion 95, and converted to have intermediate frequency by a frequency converting portion 96. The signals which have been converted to have intermediate frequency are passed to a correlator 97, where the signals are correlated with a PN code. At this time, in such a fading environment in that multiple paths exist, the correlated pulses are output with the pulse width broadened. Part of the correlated signals obtained in this manner from correlator 97 are input to a multiplier 99 through a delay portion 98, and remaining part are directly input to multiplier 99. The signal delayed by one symbol time by delay portion 98 and the signal directly transmitted from correlator 97 are multiplied by multiplier 99, and differential detection is performed. The detected output (output from multiplier 99) is integrated for a period corresponding to maximum delay spread which depends on the propagation path, from the timing of correlation of the direct path wave, data is detected at a detecting portion 101 based on the result of integration, and differentially coded data is demodulated.

By integration for a period corresponding to the delay spread, the received powers of the direct path wave and the delayed wave are added and demodulated, so that combined diversity effect is obtained, and the property under fading environment can be improved.

By such spread spectrum, communication in broader band becomes possible, enabling more effective communication against multipath fading and narrow band noise. Further, PDI provides additional advantage that diversity effect can be obtained in such an environment in that fading occurs.

In the PDI method, even when there is a period in which there is not a received signal power or only a small received signal power within the period for integration, integration continues in that period, and therefore the property may possibly be degraded. Further, when the time for integration is set, the property (maximum delay spread) of the propagation path over which communication takes place must be known in advance, and the time for integration must be set differently dependent on the propagation path.

SUMMARY OF THE INVENTION

An object of the present invention is to provide a PDI receiver having superior performance and simple structure which eliminates necessity of adjustment and which allows reduction in size.

Briefly stated, the present invention provides a PDI receiver in which received signals are sampled at a sampling period which is at least twice the chip rate, and digitized by an A/D converting circuit, the digitized received signals are correlated with predetermined bits by a correlation filter circuit, and an amplitude of a correlated value having highest correlation is calculated based on the correlated waveform by a correlated value calculating circuit. In accordance with the calculated correlated value, a reproduced clock signal is generated, a window pulse corresponding to a period determined dependent on the propagation path is generated referring to the reproduced clock signal by a window generating circuit, the output from the correlation filter circuit are digitally demodulated by a demodulating circuit, and of the outputs from the demodulating circuit, signals within the period of the window pulse generated by the window generating circuit are integrated and detected.

Therefore, according to the present invention, periods, in which received signal powers are small, outside the window period are excluded at the time of integration, and therefore properties are not degraded. Further, the period of the window determining the time for integration is defined digitally and hence such definition can be easily realized by changing the number of samples added.

More preferably, signals are taken in the sample periods in which the calculated amplitude exceeds a predetermined threshold value, and the signals are integrated and detected. Therefore, data can be obtained by determining the level within the sampling period at the detecting portion, utilizing the result of integration, the samples having small signal components within the window can be excluded, and hence performance can be improved.

More preferably, in the window generating circuit, the amplitude of the demodulated output from the demodulating circuit and a predetermined threshold value are compared in the window period, and only those samples of which amplitudes exceed the predetermined threshold value are integrated. Therefore, samples having small signal components within the window can be excluded, and hence performance can be improved.

According to another aspect of the present invention, the received signals are sampled by a sampling period which is at least twice the chip rate and digitized by an A/D converting circuit, the digitized received signals are correlated with predetermined bits by a correlation filter circuit, and an amplitude of the correlated values are calculated based on the correlated waveform. In accordance with the calculated correlated value, a reproduction clock signal is generated, a window pulse corresponding to a period determined dependent on the propagation path is generated by a window generating circuit based on the reproduction clock signal, the outputs from the correlation filter circuit within the period of the window pulse are integrated and then demodulated.

Therefore, according to this aspect of the present invention, integration is performed before demodulation, so that difference in clock frequencies between transmission and reception can be absorbed, and hence the demodulating circuit can further be simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following embodiments, the transmitting system used is the same as the conventional example shown in FIG. 9.

In the present invention, differentially coded BPSK modulation (DPSK) is used for modulating information. It goes without saying that the present invention can be applied to differential QPSK (DQPSK) by performing quadrature (four phase) differential coding at a differential coding portion and by performing QPSK modulation at a modulation portion.

Figure 1:
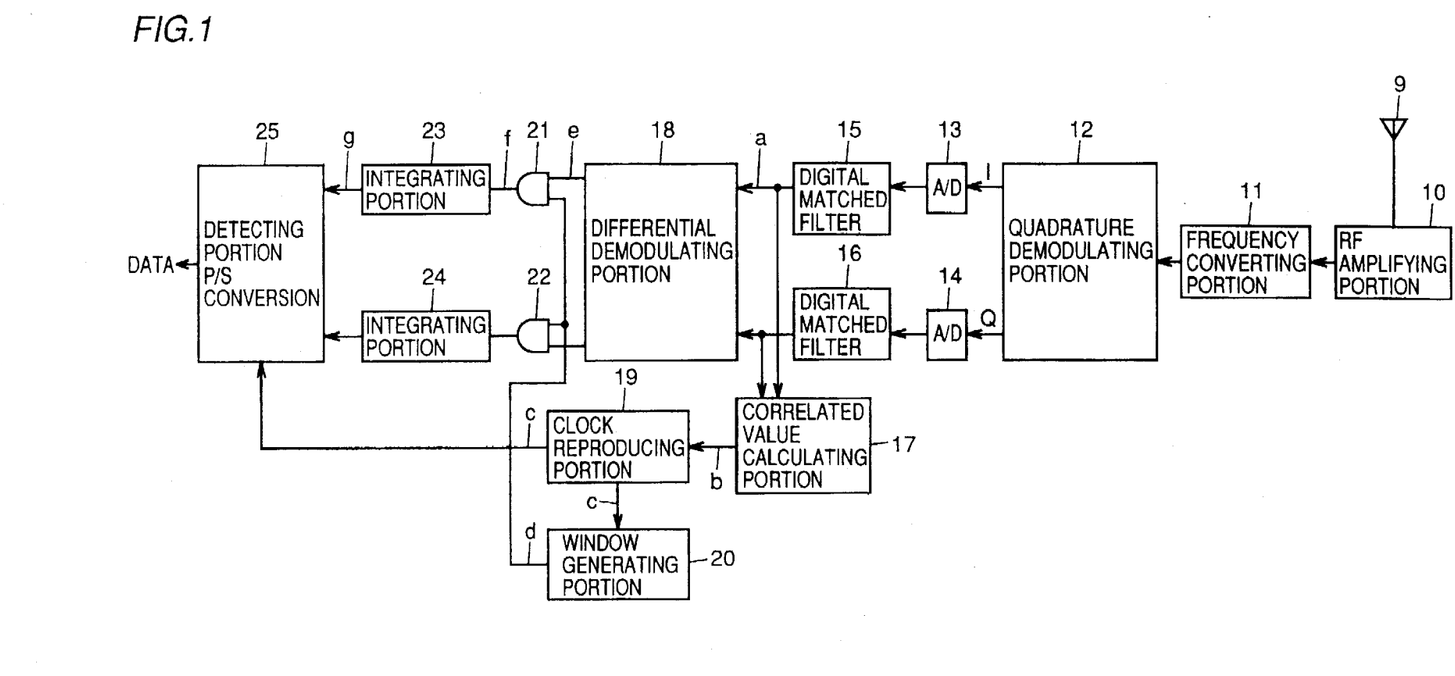
FIG. 1 is a block diagram of a first embodiment in accordance with the present invention.
Figure 2:
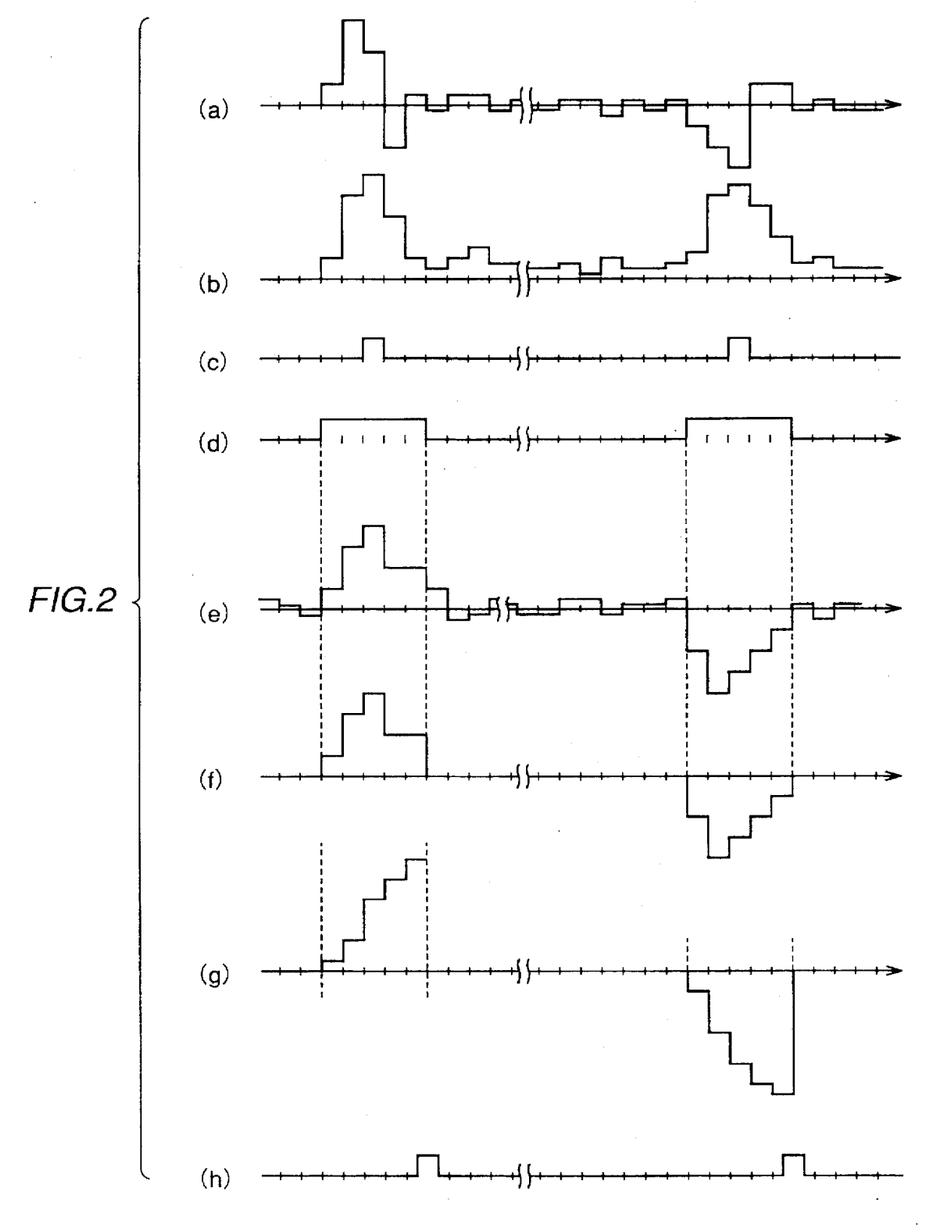
FIG. 2 is a diagram of waveforms at various portions of the first embodiment.

FIG. 1 is a block diagram of the first embodiment of the present invention. Signals received at a receiving antenna 9 are subjected to high frequency amplification by an RF amplifying portion 10, and then passed to a frequency converting portion 11 so that the signals have IF band frequency. Thereafter, the received signals are converted to I and Q base band signals by quadrature demodulating portion 12, digitized by using a sampling clock having a sampling frequency of at least twice the chip rate of the PN code at A/D converting portions 13 and 14, respectively, and then correlated by digital matched filters 15 and 16. An example of the waveform at an output portion of digital matched filter 15 is as shown in (a) of FIG. 2. FIG. 2(a) shows an example in which the received signals assume + and − values when digitized. The correlated output from digital matched filter 16 on the quadrature side is different from this figure.

The correlated outputs thus obtained are divided into two, one of which is subjected to differential demodulation by a differential demodulating portion 18, and an example of the waveform at its output portion e is as shown by (e) of FIG. 2. The other is input to a correlated value calculating portion 17, a root of square sum of respective outputs from digital matched filters 15 and 16 is calculated, and a correlated value having highest correlation is detected. An example of the waveform at output portion b is shown in (b) of FIG. 2. By using the correlated waveform, at an output portion c of a clock reproducing portion 19, a reproduction clock such as shown in (c) of FIG. 2 is reproduced, which represents a timing at which existence of the peak of correlation is expected. By using the reproduction clock pulse as a reference, windows of several samples are generated as shown in (d) of FIG. 2, at an output portion d of a window generating portion 20.

Figure 3:
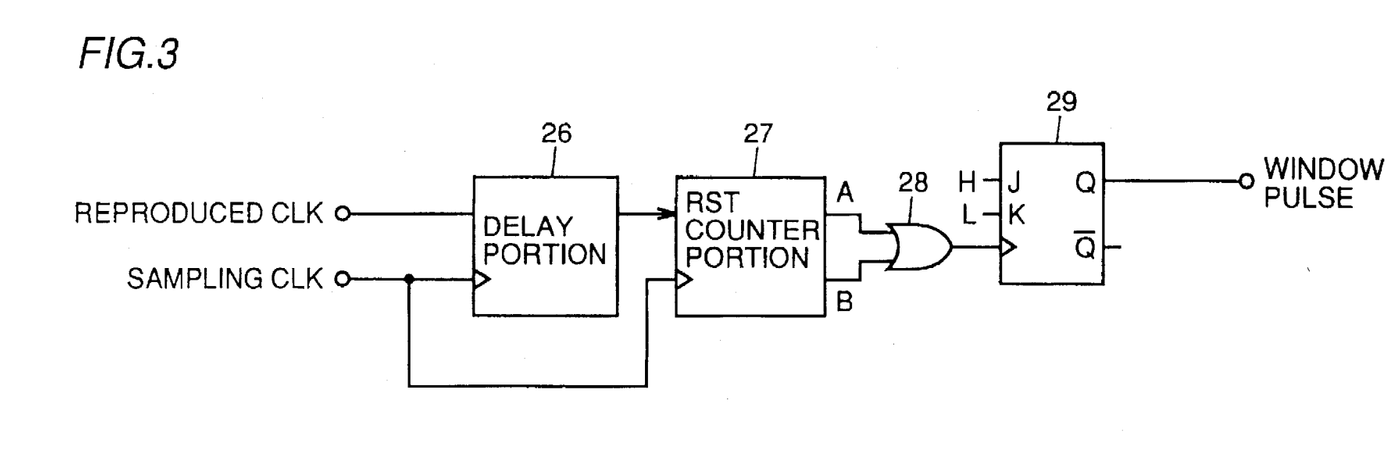
FIG. 3 is a block diagram of an example of a window generating portion in accordance with the present invention.

Generation of the window can be readily implemented by using a counter and several gate circuits. FIG. 3 is a block diagram showing an example of window generating portion 20. The window generating portion includes a delay portion 26, a counter portion 27, an OR gate 28 and a JK flipflop 29. The sampling clock and the reproduction clock from clock reproducing portion 19 are applied to delay portion 26. An output from delay portion 26 and the sampling clock are input to counter portion 27, and outputs A and B from counter portion 27, which will be described later, are input to JK flipflop 29 through OR gate 28. In the window generating portion 20, received signals are sampled at a sampling frequency which is twice the chip rate, by using a PN code having the length of 32 chips. When a window covering two samples preceding and succeeding the reproduction clock pulse signal as well (a total of 5 samples) is to be generated, in the receiver, the reproduction clock pulse is delayed larger than at least the window time width (here, at least three sample clocks) by delay portion 26, using the counter or the flipflop.

For example, assume that delay of 10 sample clocks is provided. Then the counter in the counter portion 27 is reset by the present pulse, and a pulse A which attains High only when the counter reaches the value "52" and a pulse B which attains High only when the counter reaches the value "56" are generated. These pulses can both be readily implemented by the counter and several gate circuits. These two pulses obtained in this manner are passed to an OR gate 28 to be ORed. By using the output, a signal which attains to High when the pulse A is input and attains Low when the pulse B is input is generated by JK flipflop 29. The signal generated in this manner provides a pulse which attains High after 62 sampling clocks and Low after 66 sampling clocks from the aforementioned reproduction clock pulse. This pulse may be used as the window pulse. This is only an example, and what is intended by the present invention is to generate a window utilizing PDI in digital manner.

Returning to FIG. 1, the outputs from differential demodulating portion 18 and from window generating portion 20 are ANDed by AND gates 21 and 22, respectively. FIG. 2(f) shows an example of the waveform at an output portion f of AND gate 21. Outputs from AND gates 21 and 22 are integrated for the window period, at integrating portions 23 and 24, respectively. FIG. 2(g) shows an example of the waveform at an output portion g of integrating portion 23. By using the result of integration, in a data detecting portion 25, the reproduction clock is altered to a detection clock such as shown in FIG. 2(h) of which timing is adjusted to determine the result of integration over all the window periods (in this example, it is implemented by simply providing a delay of 2.5 samples), and using the detection clock, the signals are detected at detecting portion 25. In case DQPSK demodulation is to be performed, parallel/serial conversion (hereinafter referred to as P/S conversion) is performed, and data is obtained.

By the present embodiment, the PDI method can be readily implemented in digital manner.

Figure 4:
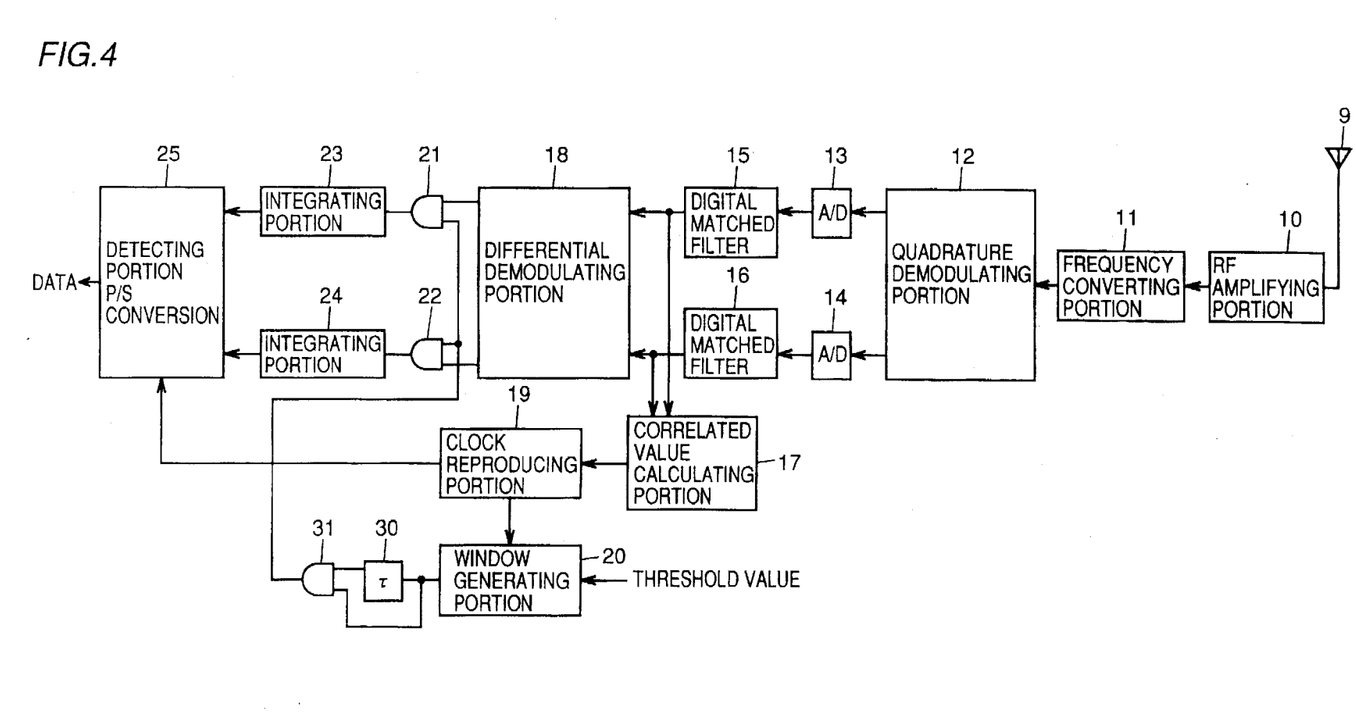
FIG. 4 is a block diagram of a second embodiment of the present invention.

FIG. 4 is a block diagram of the second embodiment. The present embodiment differs from the first embodiment in that the window generating portion has additional function to provide a pulse which attains to ON state when the correlated value exceeds a threshold. The details of operation will be described in the following.

As in the first embodiment, the signals received at receiving antennas 9 are power amplified by RF amplifying portion 10, and passed through frequency converting portion 11 where the frequency is converted to IF band. Thereafter, by quadrature demodulating portion 12, the IF signals are converted to I and Q base band signals, which are digitized by A/D converting portions 13 and 14, respectively. The digitized signals are correlated by digital matched filters 15 and 16. As in the first embodiment, in A/D converting portions 13 and 14, the signals are sampled at a sampling frequency which is at least twice the chip rate of PN code.

Figure 5:
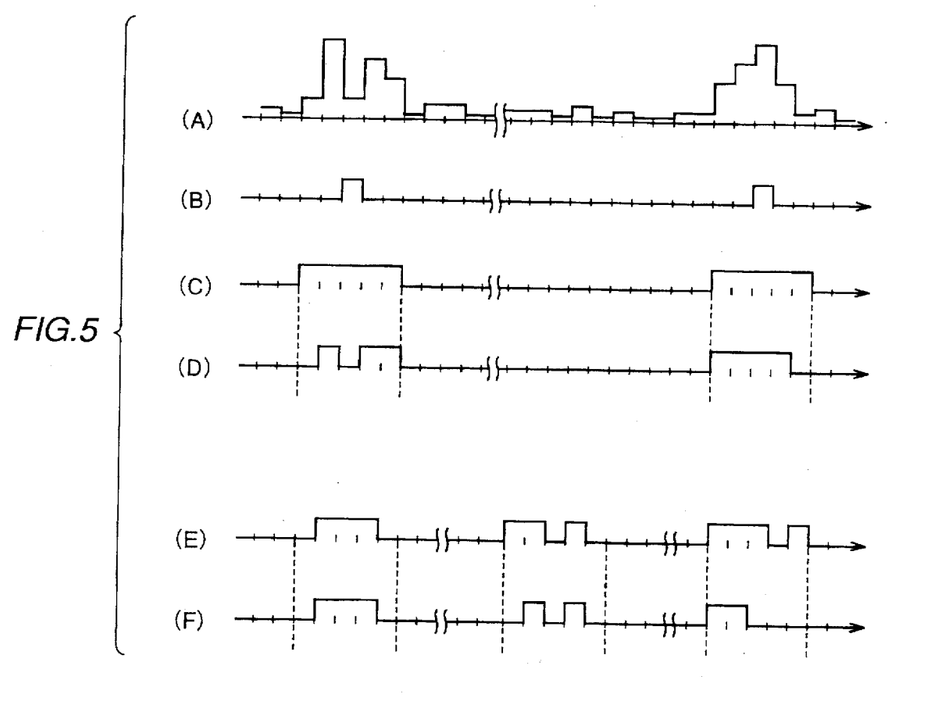
FIG. 5 is a diagram of waveforms at various portions of the second embodiment.

The correlated output obtained in this manner are divided into two, and one of which is input to differential demodulating portion 18 and differentially demodulated. The other is input to correlated value calculating portion 17 and root of square sum is calculated. The output from correlated value calculating portion 17 is as shown in FIG. 5(A), for example. By using the output from correlated value calculating portion 17, a reproduction clock representing the correlation peak timing is reproduced from clock reproducing portion 19. This clock has such a waveform as shown in (B) of FIG. 5, for example. The above described operation is performed based on the same principle as described with reference to the first embodiment.

By using the reproduction clock obtained from clock reproducing portion 19, a window corresponding to several samples is generated, referring to a timing at which existence of the peak of correlation is expected, in window reproducing portion 20. The waveform is as shown in (C) of FIG. 5, for example. Further, in the present embodiment, a threshold is provided in the window generating portion 20. When the window is to be produced, a pulse which attains ON only at the sample timing where the signal level exceeds the threshold within the above described window period is generated and output. Its waveform is as shown in (d) of FIG. 5, for example.

Here, the threshold value may be initially set externally, or it may be internally optimized based on the power of received signals obtained from the output of the correlated value calculating portion 17.

Though not shown, this operation can be readily implemented by providing an AND of an output from window generating portion 20 shown in FIG. 3 described in the first embodiment and an output of a comparator comparing the threshold with the output from the correlated value calculating portion 17 (which comparator outputs High when the correlated value output is larger than the threshold). Further, the outputs from the window generating portion 20 are divided into two, one of which is directly input to a gate circuit 31, and the other is delayed by one symbol by a delay portion 30. The directly input window pulse and the delayed window pulse are ANDed, and a modified window pulse of which pulse width is different from that of the output at the window generating portion 20 is generated. Referring to the examples of waveforms of this operation, when the output from window generating portion 20 is as shown by (E) of FIG. 5, the output from AND gate 31 would have such a waveform as represented by (F) of FIG. 5. Here, since the transmission symbol rate is known, the delay portion 30 can be readily implemented by using a sampling clock and a counter.

The output from differential demodulating portion 18 and the output from the AND gate 31 are ANDed at gate portions 21 and 22, and respective outputs are integrated for the window period in integrating portions 23 and 24, respectively. Using the results of respective integration, by using a detection timing clock provided by adjusting the timing of the aforementioned reproduction clock, data is detected and determined at detecting portion 25, as in the first embodiment. In case of DQPSK demodulation, data is obtained after P/S conversion.

In the first embodiment, integration is performed through the window, and even a sample having very small symbol component has been integrated, possibly causing degradation in performance. However, only the correlated outputs at such timings that exceed the threshold are integrated in the present embodiment, and hence PDI having higher performance can be obtained.

Figure 6:
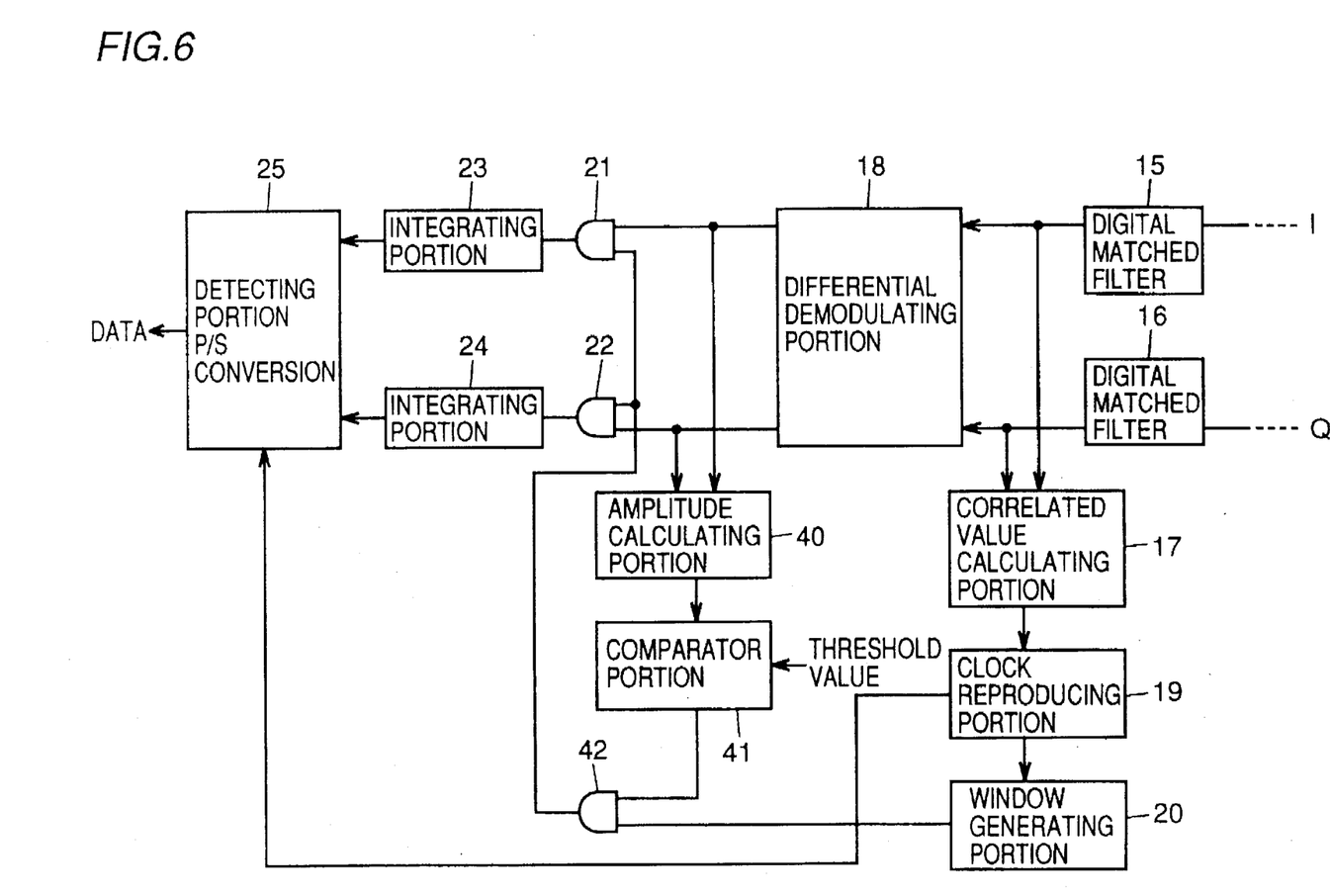
FIG. 6 is a block diagram of a third embodiment of the present invention.

FIG. 6 is a block diagram of the third embodiment. The structure and operation until quadrature demodulation and A/D conversion are the same as in the first and second embodiments. FIG. 6 shows a portion in the succeeding stage of A/D conversion, starting from digital matched filter portions. This embodiment differs from the second embodiment described above in that a detecting circuit is provided directly at the output of the differential demodulating portion, a threshold is provided for the output from the detecting circuit, and only the samples exceeding the threshold are integrated in the integrating circuit of the succeeding stage, thus providing similar effects. Detailed operation will be described in the following.

The base band quadrature signals digitized in the similar manner as in the second embodiment are correlated in digital matched filters 15 and 16, respectively. The correlated outputs are divided into two, one of which is input to differential demodulation portion 19 and the other is input to correlated value calculating portion 17. In correlated value calculating portion 17, root of square sum of both correlated outputs is calculated in the similar manner as in the second embodiment. By using the output from the correlated value calculating portion 17 obtained in this manner, a timing at which existence of the peak value of correlation is expected it presumed at the clock reproducing portion 19, and a reproduction clock representing that timing is generated. By using the reproduction clock, a window pulse corresponding to a period determined dependent on the property of the propagation path is generated in window generating portion 20, using the reproduction clock pulse as a reference.

As for the method of producing a window pulse, it can be implemented in the similar manner as shown in FIG. 3 with respect to the first embodiment. The outputs from differential amplifying portion 18 are divided into two, one of which is input to gate portions 21 and 22, and the other is input to an amplitude calculating portion 40. Here, in the amplitude calculating portion 40, a root of square sum of cosine and sin axes outputs of differential demodulating portion 18 is calculated. The result of calculation is compared with a threshold value at a comparator portion 41, and a signal which is ON only at a sample timing at which the aforementioned result of amplitude calculation is larger than the threshold value is generated and output. The threshold value may be initially set externally as in the first embodiment, or it may be internally optimized based on the power of received signals obtained from the output of the correlated value calculating portion.

The output from comparator portion 41 obtained in this manner is ANDed with the window pulse from window generating portion 20 at an AND portion 42, and using the modified window pulse, which is the ANDed output, the output of both components at the differential amplifying portion 18 are gated at gate portions 21 and 22. The outputs from gate portions 21 and 22 are integrated for the window period in integrating portions 23 and 24, respectively. Using the respective results of integration, data is detected at detecting portion 25 using a detection timing clock obtained by adjusting the timing of the reproduction clock, as in the first and second embodiments. In case of DQPSK demodulation, data is obtained after P/S conversion.

Figure 7:
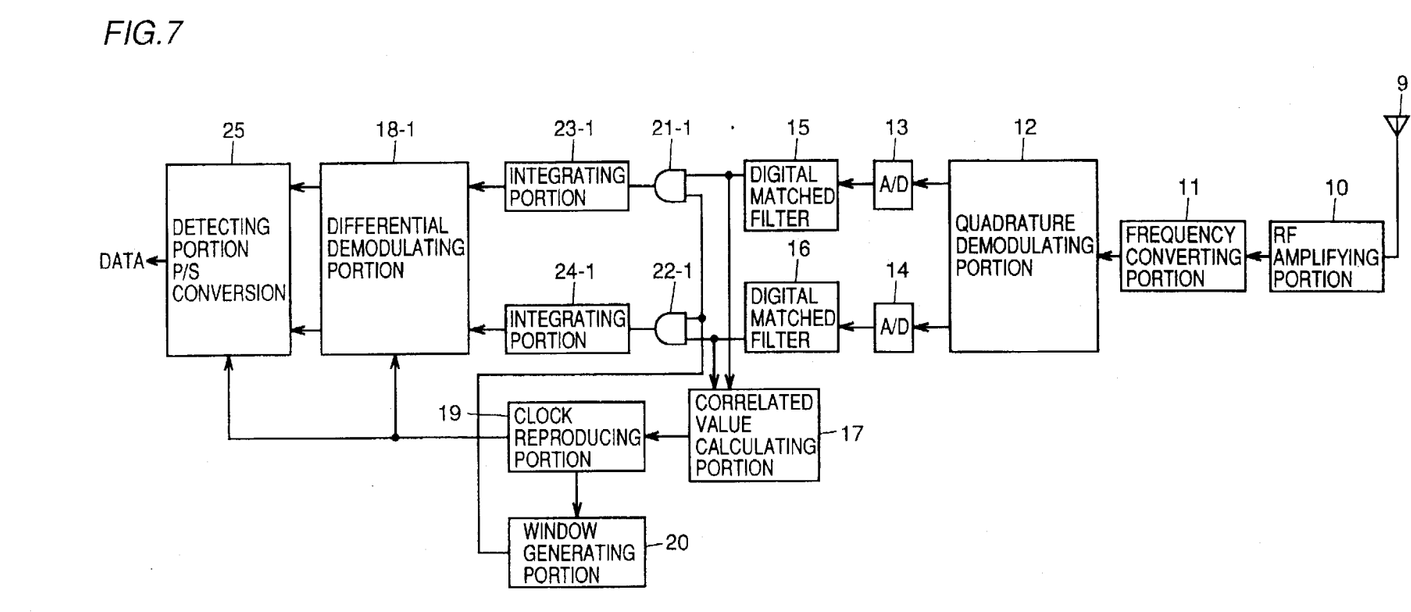
FIG. 7 is a block diagram of a fourth embodiment of the present invention.

FIG. 7 is a block diagram of the fourth embodiment. The present embodiment differs from the first to third embodiments in that integration, which is performed after differential demodulation in the above embodiments, is performed prior to differential demodulation in the present embodiment. Details of the operation will be described.

In the present embodiment, as in the above described embodiments, signals received by receiving antenna 9 are subjected to power amplification and frequency conversion to IF band, by power amplifying portion 10 and frequency converting portion 11. Thereafter, the IF signals are converted to base band quadrature signals by quadrature demodulating portion 12, and the signals are digitized by A/D converting portions 13 and 14. Thereafter, the signals are correlated by digital matched filters 15 and 16. So far, the operation is the same as the first to third embodiments. Thereafter, correlated outputs are divided into two, one of which is input to gate portions 21-1, 22-1 and the other is input to correlated value calculating portion 17. The correlated value calculating portion 17 can be readily implemented, in the similar manner as in the first and second embodiments, in which root of square sum of outputs from the quadrature digital matched filters 15 and 16 is calculated.

The correlated output obtained in this manner is input to clock reproducing portion 19, a timing at which existence of the peak value of the correlation is expected is presumed, and a reproduction clock representing that timing is generated. By using the reproduction clock, a window pulse having a time width determined dependent on the propagation path is generated in window generating portion 20. The window pulse is input to gate portions 21-1 and 22-1; whereby the output from the aforementioned digital matched filters 15 and 16 are gated. The outputs obtained from gate portions 21-1 and 22-1 in this manner are integrated for the period of the window pulse by integrating portions 23-1 and 24-1, and using the result of integration, differential demodulation is performed in differential demodulating portion 18-1. Based on the result of differential demodulation, data is detected at detecting portion 25 using the detection timing clock which is obtained by adjusting the timing of the reproduction clock. In case of DQPSK demodulation, data is obtained after P/S conversion.

In the first to third embodiments above, integration is performed after differential detection. Therefore, when there is a difference between clock frequencies for generating for PN codes between the transmitter and the receiver, the timing of peak correlation of the received signals may possibly be offset by 1 sample with respect to a symbol preceding by 1 bit, which may cause degradation in performance because of mistiming at the time of differential demodulation in the differential demodulating portion in the receiver, where demodulation is performed with a delay of 1 symbol. However, according to the method of the present embodiment, integration is performed prior to differential detection. Therefore, degradation in performance caused by mistiming can be avoided.

Further, in the differential demodulating portion 181, in the first to third embodiments, it is necessary to differentially detect all the samples within the window pulse period. However, in the present embodiment, delay by 1 symbol can be readily realized by using the reproduction clock pulse, and what is necessary is only differential detection of the timing of the result of integration within 1 symbol. Therefore, as compared with the first to third embodiments, the circuit structure of the differential demodulating portion can be simplified considerably.

Setting of the threshold as described with respect to the second and third embodiments may be readily applied to the present embodiment, whereby the performance can further be improved.

Figure 8:
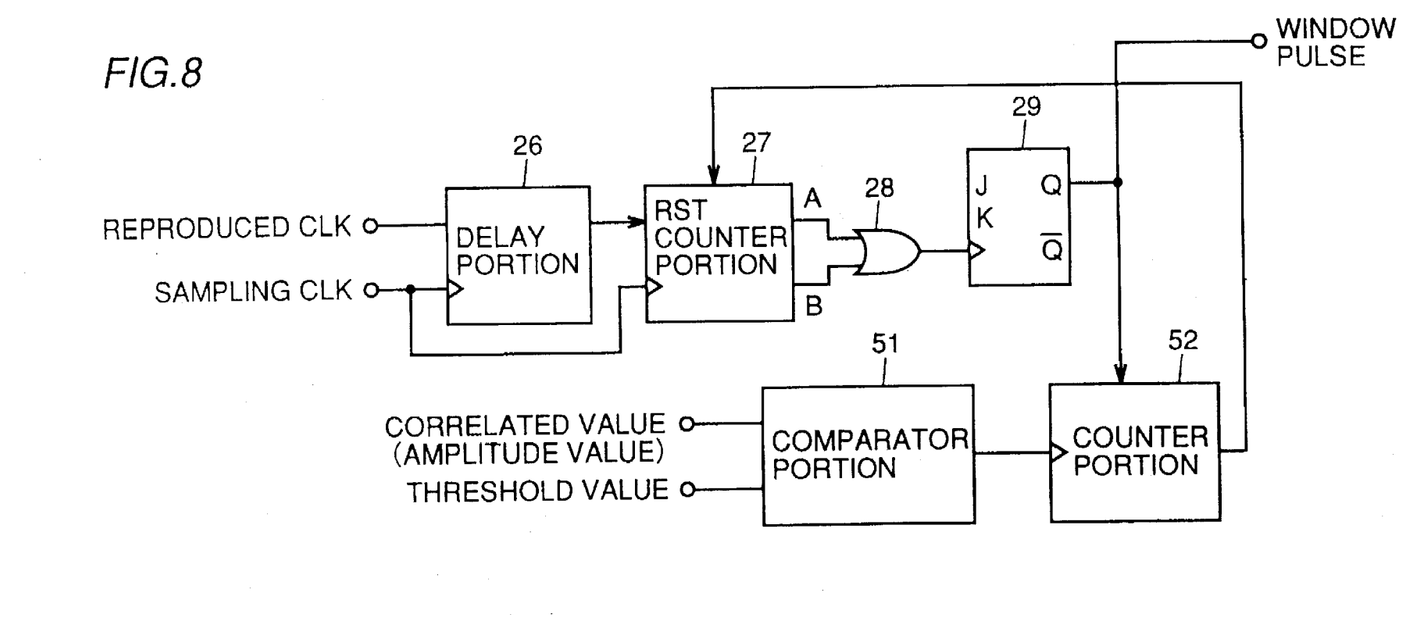
FIG. 8 is a block diagram of an embodiment of window time width control in accordance with the present invention.

FIG. 8 is a block diagram of another embodiment of the window generating portion in which the time width of the window is controlled. The principle of operation will be described in detail in the following.

As described with reference to FIG. 3, a window pulse is generated by delay portion 26, counter portion 27, OR portion 28 and JK flipflop 29, using the reproduction clock. This operation is only an example, and it may be implemented by any other method. In the example shown in FIG. 8, a comparator portion 51 and a counter portion 52 are added to the circuit shown in FIG. 3. The threshold value and the correlated value from the correlated value calculating portion 17 of FIG. 4 are input to comparator portion 51, an output obtained from the comparison between these two is transmitted to counter portion 52, and further to counter portion 27. The window pulse from JK flipflop 29 is also input to counter portion 52. In comparator portion 51, the correlated amplitude value calculated in correlated value calculating portion is compared with the threshold value, and a pulse which attains High only when the correlated value is larger is generated and output. In the present embodiment, counter portion 22 is provided at the output of comparator portion 51, and the number of samples which exceeds the threshold within the sample period which corresponds to the window pulse plus several samples preceding and succeeding the window pulse is counted by counter portion 52. If the resulting count is relatively larger than the number of samples within the window time width, the result is fed back to counter portion 27 for generating the window pulse, the timing for generating the pulse A described with reference to the first embodiment is advanced by one or several samples, and the timing for generating the pulse B is delayed by one or several samples. By doing so, the window pulse time width can be made wider.

If the resulting count is relatively smaller than the number of samples in the window time width, the result is fed back to counter portion 27 for generating the window pulse, the timing for generating pulse A described with reference to the first embodiment is delayed by one or several samples, and the timing for generating pulse B is advanced by one or several samples. By doing so, the window pulse time width can be made narrower. Thus, the window time width is controlled. The foregoing is only an example of the method for controlling the window time width. The feature of the present invention is to control the window time width based on the number of samples exceeding the threshold, within the window pulse period and the sample period which is obtained by adding several samples preceding and succeeding the window pulse period used for PDI. Therefore, any other method may be employed for actual implementation.

By using this method, the window time width can be automatically adjusted even in a communication path of which propagation path properties are not known, enabling communication with optimum window time width. Further, similar effects can be obtained by changing the input signal to be compared with the threshold value at comparator portion 51 from the output of correlated value calculating portion 17 to the amplitude value obtained from amplitude calculating portion 40 at the output of the differential demodulating portion described with reference to the third embodiment.

According to the embodiments of the present invention, in general spread spectrum communication system of direct sequence, PDI method can be readily implemented in digital manner. Further, by providing a threshold in generating the window and thereby saving samples received with low power at the time of integration, performance can be improved. Further, by performing integration prior to differential demodulation, difference in clock frequencies between the transmitter and the receiver can be absorbed, whereby the differential demodulating portion can be simplified. Further, by controlling the window used for PDI based on the number of samples which have exceeded the threshold, communication with optimal window time width becomes possible even through a communication path of which propagation path properties are not known.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A Post Detection Integration (PDI) receiver, comprising:

A/D converting means for sampling received signals at a sampling period of at least twice a chip rate of a predetermined bits;

correlation filter means for correlating said received signals digitized by said A/D converting means with the predetermined bits;

correlated value calculating means for calculating amplitude of a correlated value from correlated waveform of an output from said correlation filter means;

clock reproducing means for generating a reproduction clock signal in accordance with the correlated value calculated by said correlated value calculating means;

demodulating means for digitally demodulating an output from said correlation filter means;

window generating means for generating a window pulse of a period determined dependent on a propagation path, referring to the reproduction clock signal generated by said clock reproducing means; and detecting means for detecting data by integrating, of output signals from said demodulating means, signals within the window pulse generated by said window generating means.

2. The PDI receiver according to claim 1, wherein said detecting means includes gate means for gating an output from said demodulating means by the window pulse generated by said window generating means, integrating means for integrating outputs from said gate means, and means for detecting an output from said integrating means.

3. The PDI receiver according to claim 2, wherein said window generating means opens a gate of said gate means during a sample period in which amplitude value of the correlated value calculated by said correlated value calculating means exceeds a predetermined threshold value.

4. The PDI receiver according to claim 2, wherein said window generating means opens a gate of said gate means during a window period in which amplitude value of the output of said demodulating means exceeds a predetermined threshold value.

5. The PDI receiver according to claim 2, further comprising:

amplitude calculating means for calculating amplitude of an output from said demodulating means;

comparing means for comparing an output from said amplitude calculating means and a predetermined threshold value; and gate means for gating an output signal from said comparing means and the window pulse generated by said window generating means, and when the output of said amplitude calculating means is larger than said threshold value within the window period, for outputting a window pulse of which pulse width is modified.

6. A Post Detection Integration (PDI) receiver, comprising:

A/D converting means for sampling received signals at a sampling period which is at least twice a chip rate of a predetermined bits;

correlation filter means for correlating said received signals digitized by said A/D converting means with the predetermined bits;

correlated value calculating means for calculating an amplitude of a correlated value from correlated waveform of an output from said correlation filter means;

clock reproducing means for generating a reproduction clock signal in accordance with the correlated value calculated by said correlated value calculating means;

window generating means for generating a window pulse of a period determined dependent on a propagation path, referring to said reproduction clock signal;

integrating means for integrating outputs from said correlation filter means within the period of the window pulse generated by said window generating means; and demodulation detecting means for demodulating and detecting an output from said integrating means.

7. The PDI receiver according to claim 6, wherein said integrating means includes gate means for opening a gate only during the period of the window pulse generated by said window generating means, for outputting an output signal of said correlation filter means, and means for integrating outputs from said gate means.

8. The PDI receiver according to claim 6, wherein said window generating means includes comparing means for comparing a correlated amplitude value at an output of said correlated value calculating means and a predetermined threshold value, and gate means for gating the window pulse generated by said window generating means and an output from said comparing means, and when the output from said correlated value calculating means is larger than said threshold value within the window period, for generating a pulse.

9. The PDI receiver according to claim 6, wherein said window generating means includes comparing means for comparing a correlated amplitude value at an output of said correlated value calculating means and a predetermined threshold value, counting means for counting number of samples in which said correlated amplitude value is larger than said threshold value within an initially set window period, and means for changing width of said window period, in accordance with a count output from said counting means.

10. The PDI receiver according to claim 6, wherein said window generating means includes comparing means for comparing an amplitude value of an output of said demodulating means and a predetermined threshold value, counting means for counting number of samples in which said amplitude value is larger than said threshold value within an initially set window period and within a period corresponding to said window period and several samples preceding and succeeding the window period, and means for changing said window period in accordance with a count output from said counting means.

* * * * *